US012744312B2

(12) United States Patent
Wyckoff

(10) Patent No.: US 12,744,312 B2
(45) Date of Patent: Sep. 22, 2026

(54) ANTENNA ARRAY SYSTEM WITH DISPARATE BEAM FORMING NETWORKS AND NON-LINEAR FILTERING TO MITIGATE INTERFERENCE

(71) Applicant: VIASAT, INC., Carlsbad, CA (US)

(72) Inventor: Peter S. Wyckoff, Scottsdale, AZ (US)

(73) Assignee: VIASAT, INC., Carlsbad, CA (US)

( * ) Notice: Subject to any disclaimer, the term of this patent is extended or adjusted under 35 U.S.C. 154(b) by 49 days.

(21) Appl. No.: 18/893,166

(22) Filed: Sep. 23, 2024

(65) Prior Publication Data

US 2025/0023231 A1 Jan. 16, 2025

Related U.S. Application Data

(62) Division of application No. 17/263,261, filed as application No. PCT/US2019/044536 on Jul. 31, 2019, now Pat. No. 12,126,091.

(60) Provisional application No. 62/714,547, filed on Aug. 3, 2018.

(51) Int. Cl.

| | |
|---|---|
| ***H01Q 3/26*** | (2006.01) |
| ***H01Q 21/00*** | (2006.01) |
| ***H04B 7/06*** | (2006.01) |
| ***H04B 7/08*** | (2006.01) |

(52) U.S. Cl.

CPC ....... *H01Q 3/2611* (2013.01); *H01Q 21/0006* (2013.01); *H04B 7/0617* (2013.01); *H04B 7/086* (2013.01)

(58) Field of Classification Search

CPC ....... H01Q 3/2611–2641; H01Q 21/00; H04B 7/0615–0617; H04B 7/086

See application file for complete search history.

(56) References Cited

U.S. PATENT DOCUMENTS

| | | | |
|---|---|---|---|
| 5,579,016 | A | 11/1996 | Wolcott et al. |
| 6,115,409 | A | 9/2000 | Upadhyay et al. |
| 7,429,949 | B1 | 9/2008 | Trigui |

(Continued)

OTHER PUBLICATIONS

Wyckoff, "Non-Linear Interference Mitigation Using Arrays", 2016 United States National Committee of URSI National Radio Science Meeting, IEEE, Jan. 6, 2016, 2 pages.

(Continued)

*Primary Examiner* — Hasan Islam

(74) *Attorney, Agent, or Firm* — F. CHAU & ASSOCIATES, LLC

(57) ABSTRACT

Disclosed is an antenna array system including an antenna array of N≥2 antenna elements that output N antenna signals; an interferer-nulling beam forming network (IN-BFN) coupled to the antenna array, N non-linear filters coupled to the IN-BFN, and a desired signal BFN. The IN-BFN may include N "null BFNs" to generate N null signals, each null BFN applying a respective nulling beam weight set to the N antenna signals to generate a respective one of the N null signals. Each respective nulling beam weight set corresponds to a different respective set of (N−1) independent nulls. Each of the N non-linear filters may filter a respective one of the N null signals to provide a respective one of N filtered signals. The desired signal BFN may apply a desired signal beam weight set to the N filtered signals to generate an output signal.

12 Claims, 12 Drawing Sheets

(56) References Cited

U.S. PATENT DOCUMENTS

| | | | | |
|---|---|---|---|---|
| 8,923,189 | B2 * | 12/2014 | Leabman ........... | H04B 7/18506 455/13.1 |
| 9,456,354 | B2 | 9/2016 | Branlund | |
| 10,256,528 | B2 | 4/2019 | Chang | |
| 2003/0025633 | A1 | 2/2003 | Cai et al. | |
| 2013/0070741 | A1 | 3/2013 | Li et al. | |
| 2013/0089009 | A1 | 4/2013 | Li et al. | |

OTHER PUBLICATIONS

International Search Report dated Oct. 24, 2019 in corresponding PCT Application No. PCT/US2019/044536 (4 pages).
European Search Report dated Oct. 24, 2019 in corresponding PCT Application No. PCT/US201 9/044536 (4 pages).
Henttu, "A New Interference Suppression Algorithm Against Broadband Constant Envelope Interference", University of Oulu, Telecommunication Laboratory, Oulu, Finland, 2000 IEE, pp. 742-746.
Wyckoff, et al., "Polar Excision for Radio Frequency Interference Mitigation in Radio Astronomy", 2016 Radio Frequency Interference (RFI), IEEE, Oct. 17, 2016,4 pages.

* cited by examiner

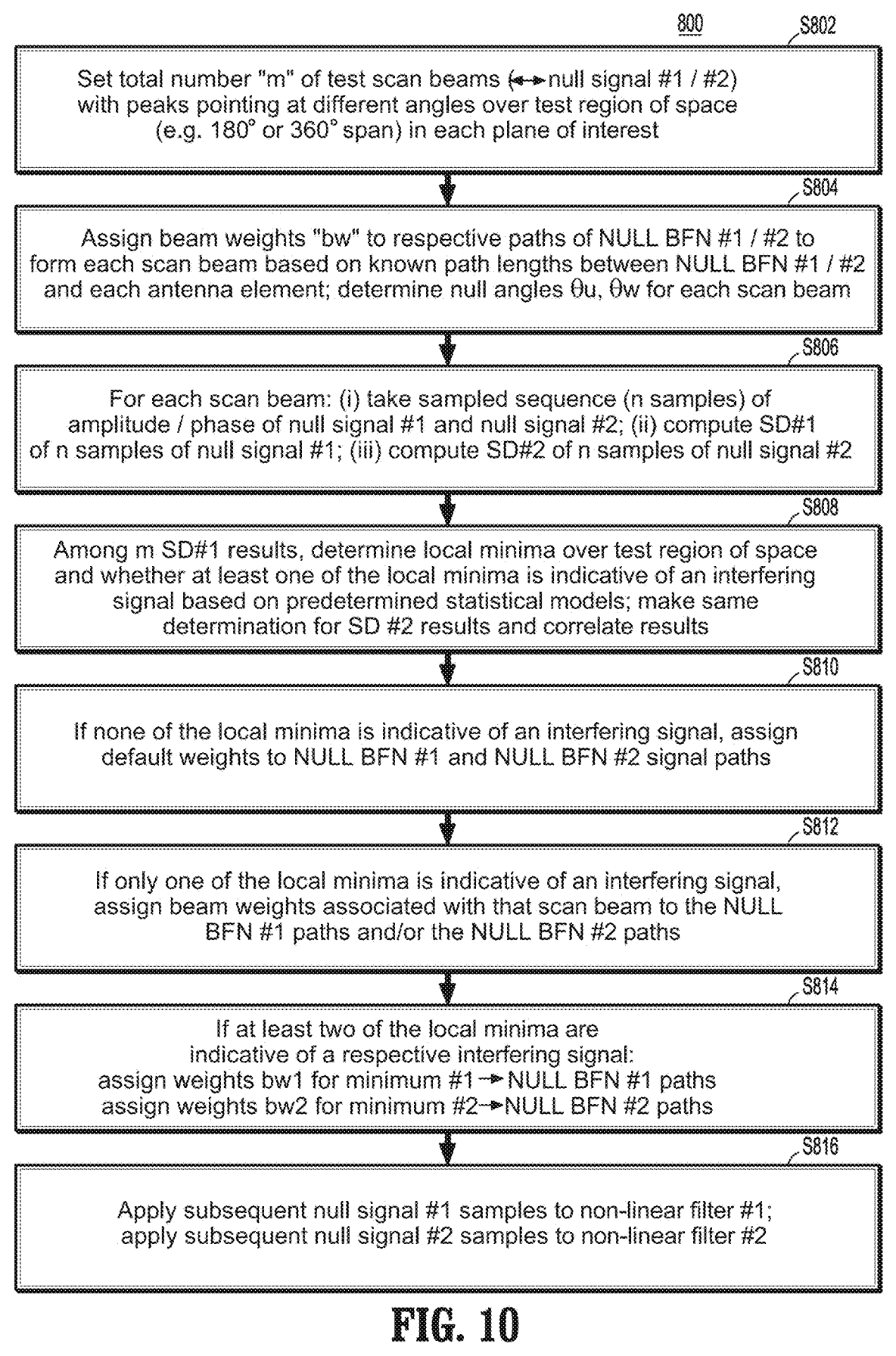

800

S802
Set total number "m" of test scan beams (↔ null signal #1 / #2) with peaks pointing at different angles over test region of space (e.g. 180° or 360° span) in each plane of interest S804
Assign beam weights "bw" to respective paths of NULL BFN #1 / #2 to form each scan beam based on known path lengths between NULL BFN #1 / #2 and each antenna element; determine null angles θu, θw for each scan beam S806
For each scan beam: (i) take sampled sequence (n samples) of amplitude / phase of null signal #1 and null signal #2; (ii) compute SD#1 of n samples of null signal #1; (iii) compute SD#2 of n samples of null signal #2

S808
Among m SD#1 results, determine local minima over test region of space and whether at least one of the local minima is indicative of an interfering signal based on predetermined statistical models; make same determination for SD #2 results and correlate results S810
If none of the local minima is indicative of an interfering signal, assign default weights to NULL BFN #1 and NULL BFN #2 signal paths S812
If only one of the local minima is indicative of an interfering signal, assign beam weights associated with that scan beam to the NULL BFN #1 paths and/or the NULL BFN #2 paths S814
If at least two of the local minima are indicative of a respective interfering signal:
assign weights bw1 for minimum #1 → NULL BFN #1 paths
assign weights bw2 for minimum #2 → NULL BFN #2 paths S816
Apply subsequent null signal #1 samples to non-linear filter #1; apply subsequent null signal #2 samples to non-linear filter #2

FIG. 10

ANTENNA ARRAY SYSTEM WITH DISPARATE BEAM FORMING NETWORKS AND NON-LINEAR FILTERING TO MITIGATE INTERFERENCE

CROSS REFERENCE TO RELATED APPLICATIONS

This application is a divisional of U.S. patent application Ser. No. 17/263,261, filed in the U.S. Patent and Trademark Office on Jan. 26, 2021, which is a 371 national stage entry of PCT Application No. PCT/US2019/044536, filed Jul. 31, 2019, which claims priority to U.S. Provisional Application No. 62/714,547 filed in the U.S. Patent and Trademark Office on Aug. 3, 2018, the entire contents of which are incorporated herein by reference.

TECHNICAL FIELD

This disclosure relates generally to antenna arrays and more particularly to techniques for mitigating interference signals received by an antenna array and thereby improving signal quality of a received desired signal.

DISCUSSION OF RELATED ART

An antenna system employing an antenna array of N antenna elements (N=two or more) may occasionally face an operational challenge of accurately recovering the information carried by a weak desired signal received in a noisy environment with N stronger interference signals (interchangeably, "interfering signals"). Further, the desired signal and/or the N interfering signals may arrive at the antenna array from unknown directions. That is, the interfering signals may have different unknown spatial signature vectors. Further, the interfering signals and the desired signal may partially or completely overlap in the time and frequency domains.

Traditional signal processing approaches to attenuate interfering signals, such as those employing linear spatial filtering or conventional excision algorithms, are typically unable to recover the desired signal in such an environment without unsatisfactory degradation in its signal quality and signal to noise ratio.

SUMMARY

In an aspect of the presently disclosed technology, an antenna array system includes an antenna array of N≥2 antenna elements that output N antenna signals; an interferer-nulling beam forming network (IN-BFN) coupled to the antenna array; N non-linear filters coupled to the IN-BFN; and a desired signal BFN. The IN-BFN may include N "null beam forming networks" (null BFNs) to generate N null signals, each null BFN applying a respective nulling beam weight set to the N antenna signals to generate a respective one of the N null signals. Each respective nulling beam weight set corresponds to a different respective set of (N−1) nulls. Each of the N non-linear filters may filter a respective one of the N null signals to provide a respective one of N filtered signals. The desired signal BFN may apply a desired signal beam weight set to the N filtered signals to generate an output signal.

The antenna array system may be capable of improving signal quality of the desired weak signal in an environment with N stronger interfering signals, by significantly attenuating the interfering signals relative to the desired signal. The N interfering signals may each arrive at the antenna array from different directions.

In another aspect, a method for suppressing a plurality of interference signals received by an antenna array that concurrently receives a desired signal involves: receiving N antenna signals from an antenna array comprising N antenna elements, where N is greater than one. Respective arrival directions of the interference signals upon the antenna array are obtained. Each of a plurality of nulling beam weight sets are applied to a respective one of N null BFNs of an interferer-nulling beam forming network coupled to the antenna array to generate N null signals. Each nulling beam weight set corresponds to a different respective set of (N−1) independent nulls corresponding to (N−1) of the arrival directions, such that within each null signal, (N−1) of the interference signals are suppressed with respect to each of a remaining one of the interference signals and the desired signal. Each of the N null signals are filtered using a respective one of N non-linear filters to suppress the respective remaining one of the interference signals with respect to the desired signal, thereby generating N filtered signals. The N filtered signals are combined to generate an output signal corresponding to the desired signal.

BRIEF DESCRIPTION OF THE DRAWINGS

The above and other aspects and features of the disclosed technology will become more apparent from the following detailed description, taken in conjunction with the accompanying drawings in which like reference characters indicate like elements or features. Various elements of the same or similar type may be distinguished by annexing the reference label directly with a second label or with a dash and second label that distinguishes among the same/similar elements (e.g., -1, -2). However, if a given description uses only the first reference label, it is applicable to any one of the same/similar elements having the same first reference label irrespective of the second reference label.

FIG. 10 is a flow chart of an example method performed by an antenna array system for mitigating interference signals.

DETAILED DESCRIPTION OF EMBODIMENTS

Figure 1:
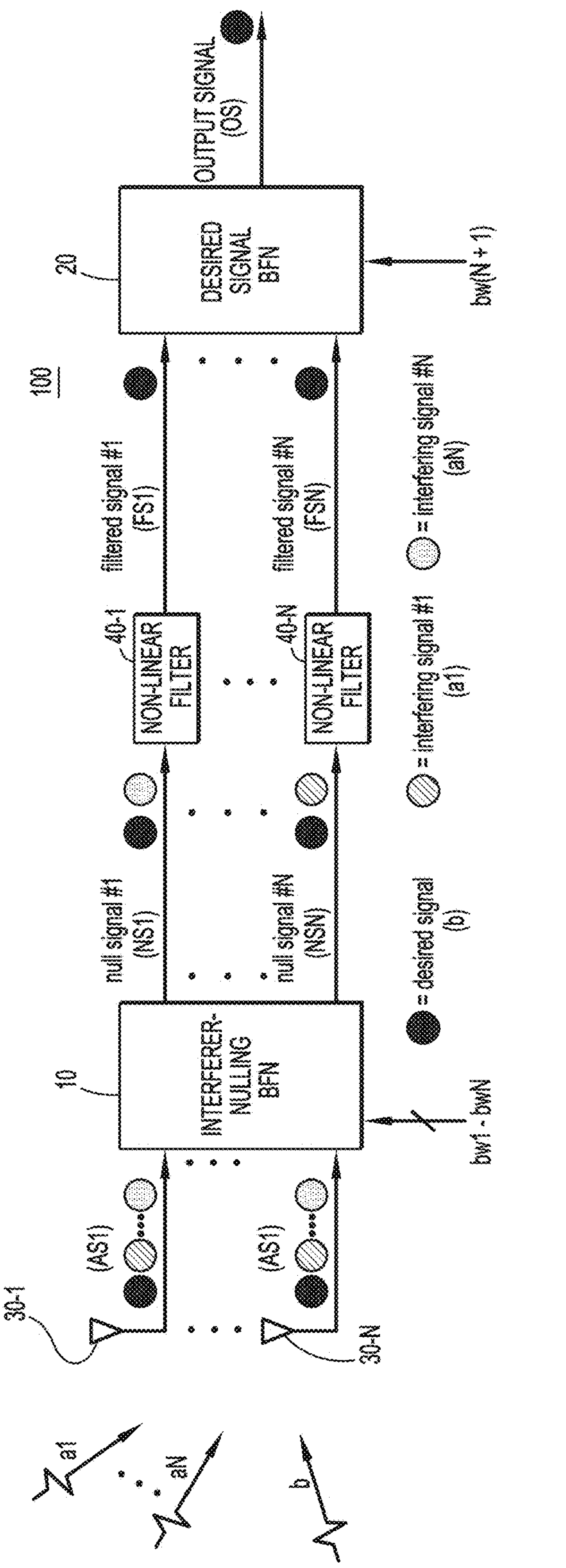
FIG. 1 is a functional block diagram of an antenna array system according to an embodiment.

The following description, with reference to the accompanying drawings, is provided to assist in a comprehensive understanding of certain exemplary embodiments of the technology disclosed herein for illustrative purposes. The description includes various specific details to assist a person of ordinary skill the art with understanding the technology, but these details are to be regarded as merely illustrative. For the purposes of simplicity and clarity, descriptions of well-known functions and constructions may be omitted when their inclusion may obscure appreciation of the technology by a person of ordinary skill in the art.

Herein, a signal that "substantially" contains only components of one or more particular signals means that the signal may also contain components of one or more other signals in minimal amounts that do not preclude using the signal to achieve the purpose it was intended to provide. For example, in some embodiments the components of the one or more other signals may be at least 10 dB below the components of the one or more particular signals. As another example, in some embodiments the components of the one more other signals may be at least 20 dB below the components of the one or more particular signals. As yet another example, in some embodiments the components of the one or more other signals may be at least 30 dB below the components of the one or more particular signals.

Herein, the term "non-linear filter" refers to a filter whose output signal is not a linear function of its input signal. A non-linear filter as described herein filters the magnitude of an input signal to the remove a constant envelope component of the input signal. The input signal that may be a superposition of a constant envelope interference signal and a desired signal. The non-linear filter removes the interference signal component of the input signal, thereby generating an output signal containing the desired signal component of the input signal. In such a case, the non-linear filter can recover the desired signal within the input signal even if the interference signal is higher in amplitude and overlaps in the time and frequency domains with the desired signal.

Embodiments described herein provide an antenna array system with N antenna elements (where N is greater than or equal to 2), that can mitigate (e.g., suppress or remove) interference caused by up to N interfering signals with respect to a desired signal. As described in more detail below, N antenna signals from the N antenna elements can be provided to each of N different "null beam forming networks" (null BFNs) of an "interferer-nulling beam forming network" (IN-BFN). Each null BFN applies a respective nulling beam weight set to the N antenna signals to generate a respective null signal. The respective nulling beam weight set corresponds to a set of N−1 independent nulls of a corresponding antenna pattern of the N antenna signals. Herein, the term "independent null" refers to a null of the corresponding antenna pattern that can, by applying the respective nulling beam weight set to the N antenna signals, be independently formed in a particular direction independent of the direction of the other independent nulls. The weighting of the N antenna signals of the N antenna elements can define the corresponding antenna pattern having N−1 independent nulls. The corresponding antenna pattern may also include additional nulls that are not independent nulls, depending on the individual element patterns of the antenna elements and the arrangement of the antenna elements in the array. The respective nulling beam weight set of each null BFN of the interferer-nulling BFN can correspond to a different set of independent nulls that null out all but one of the interfering signals. Each null BFN outputs a "null signal" which is a composite signal with a desired signal component and an interfering signal component, and this null signal is then non-linearly filtered to suppress/remove the interfering signal component and recover the desired signal. The non-linear filtering can remove the interfering signal component even though its spectral bandwidth may overlap that of the desired signal. Thus, using the techniques described herein, a desired signal having a spectrum overlapping that of up to N interfering signals is recoverable using an antenna array with as few as N antenna elements. On the other hand, conventional N-element beamforming systems null N−1 interfering signals. Conventional approaches utilizing linear beamforming techniques also cannot separate spatially overlapping co-channel and co-polarization signals. Accordingly, the present disclosed technology suppresses more interference signals than these conventional approaches.

FIG. 1 is a functional block diagram of an antenna array system, 100, according to an embodiment of the presently disclosed technology. Antenna array system 100 may include N antenna elements 30-1 to 30-N forming an antenna array, an "interferer-nulling (IN−) beam forming network (BFN) 10 that generates N "null signals"; N non-linear filters 40-1 to 40-N that output N filtered signals; and a "desired signal BFN" 20. To facilitate an understanding of the technology described herein, the following description will primarily discuss an example of N=2. Embodiments employing N=three or more will be discussed later. Accordingly, an example two element array antenna system 100 includes first and second antenna elements 30-1, 30-2 and two non-linear filters 40-1, 40-2. Antenna array system 100 may be designed to operate over any desired radio frequency (RF) band.

The following discussion for an embodiment with N=2 will generally be described as receiving one weak desired signal "b" in an environment in which first and second stronger interfering signals a1, a2 may also be received. Each of the desired signal b and the interfering signals a1, a2 may arrive at the antenna array from different directions. In an embodiment where N=three or more, discussed later, antenna array system 100 may include capability for mitigating each of the three or more interfering signals.

Interferer-nulling BFN ("IN-BFN") 10 receives first and second antenna signals AS1 and AS2, each comprising signals b, a1 and a2 (plus noise "w" discussed later) from antenna elements 30-1 and 30-2, respectively. As illustrated in FIG. 1, a first null BFN of the IN-BFN 10 generates a first null signal, i.e., null signal #1, derived from antenna signals AS1 and AS2. Null signal #1 is a signal in which interfering signal #1 has been removed due to "nulling", while the desired signal b and the interfering signal #2 (if also received) remain. Such nulling may be realized by the first null BFN within IN-BFN 10 applying a first nulling beam weight (NBW) set bw1 from among a plurality of NBW sets bw1 to bwN to the antenna signals AS1 and AS2. The first NBW set bw1 indicates amplitude and/or phase values to be applied to the antenna signals AS1 and AS2 to define a first antenna pattern having an independent null aligned with an arrival direction of interfering signal #1. In the illustrated example of N=2, the corresponding antenna pattern has one independent null. Thus, no independent null is aligned with the arrival direction of the desired signal b or interfering signal #2. Accordingly, null signal #1 can contain the desired signal b and the interfering signal #2. Likewise, a second null BFN of the IN-BFN 10 may apply a second nulling beam weight set bw2 (from among the sets bw1 to bwN) to the antenna signals AS1 and AS2 to generate a second null signal, null signal #2. The second nulling beam weight set bw2 corresponds to a second antenna pattern having its independent null aligned with the arrival direction of interfering signal #2. In doing so, interfering signal #2 is removed but desired signal b and interfering signal #1 can remain in null signal #2.

Null signals #1 and #2 are then applied to respective non-linear filters 40-1 and 40-2, which filter out the interfering signals a2 and a1, respectively. As noted earlier, a non-linear filter refers to a filter configured to receive an input signal containing an undesired signal (e.g. an interfering signal) and a desired signal and to output a filtered signal in which signal energy of the undesired signal is completely removed or suppressed relative to a desired signal even if the undesired signal and the desired signal overlap in the frequency and time domains. The resulting pair of filtered signals, i.e., filtered signals #1 and #2, are applied to desired signal BFN 20 which applies a "desired signal beam weight set" bw3 (where bw(N+1)=bw3 for the case of N=2) and combines the weighted filtered signals to generate an output signal OS composed substantially of only the desired signal b component. As explained later, a desired signal beam weight set may be applied to two or more weighting paths within desired signal BFN 20 to maximize the output signal OS. The desired signal beam weight set indicates amplitude and/or phase values to be applied to the filtered signals #1 and #2 to define a third antenna pattern having a beam peak aligned with an arrival direction of the desired signal b.

In the following discussion, a narrow-band channelization of a array of N=2 antenna elements (also referred to as a "two-element array") may be considered by the use of phase shifts below. More generally, time delays may be used for broader-band channelization mathematical considerations. A received uniform plane-wave spatial signature may be expressed by eqn. (1). The transpose operator is denoted by $[.]^T$. Thus, the spatial signature vector in eqn. (1) is a vector in complex-valued $C^{2\times 1}$ vector space.

$$s(\theta_{\Delta s}) = \left[ e^{-i\theta_{\Delta s}/2} \quad e^{-i\theta_{\Delta s}/2} \right]. \qquad \text{eqn. (1)}$$

The time-series for the first interference signal a1 as received by the two-element array may be expressed by eqn. (2), which is a vector in complex-valued $C^{2\times M}$ vector space when there are M time-domain samples from each of the two antenna elements.

$$a_1[n] = \alpha_{a1} e^{i\varphi_{a1}[n]} s(\theta_{\Delta a1}). \qquad \text{eqn. (2)}$$

Following the same form, the second interference signal a2's time-series as received by the two-element array may be expressed by eqn. (3):

$$a_2[n] = \alpha_{a2} e^{i\varphi_{a2}[n]} s(\theta_{\Delta a2}). \qquad \text{eqn. (3)}$$

The time-series for the desired signal b as received by the two-element array may be expressed by eqn. (4):

$$b[n] = \alpha_b[n] e^{i\varphi_b[n]} s(\theta_{\Delta b}). \qquad \text{eqn. (4)}$$

The final component may be complex-value additive white Gaussian noise (AWGN) w (expressed in eqn. (5)) with zero mean and covariance $\sigma^2 I$, where I represents the identity matrix.

$$w[n] = [w_1[n] w_2[n]]^T. \qquad \text{eqn. (5)}$$

The two-element array comprised of antenna elements 30-1 and 30-2 delivers the antenna signals AS1, AS2, which may be expressed as a complex valued 2×M matrix vector signal:

$$AS[n] = a_1[n] + a_2[n] + b[n] + w[n]. \qquad \text{eqn. (6)}$$

where AS is any one of the antenna signals AS1 to AS2. For example, with a two element array and M time-domain samples there will be 2×M samples.

Embodiments herein may estimate b[n] and recover data from b[n] given AS[n]. Any phase modulation may be independent among the interference signals and the desired signal. Further, the interference signals a1, a2 may each have phase modulation that is completely random. Each of interfering signals a1 and a2 may overlap completely in time and frequency with desired signal b. Consequently, the interference signals a1, a2 may not be adequately separated from the desired signal b using a linear filter or linear spatial filter. Embodiments described herein employ non-linear signal processing to perform the signal separation.

Figure 2:
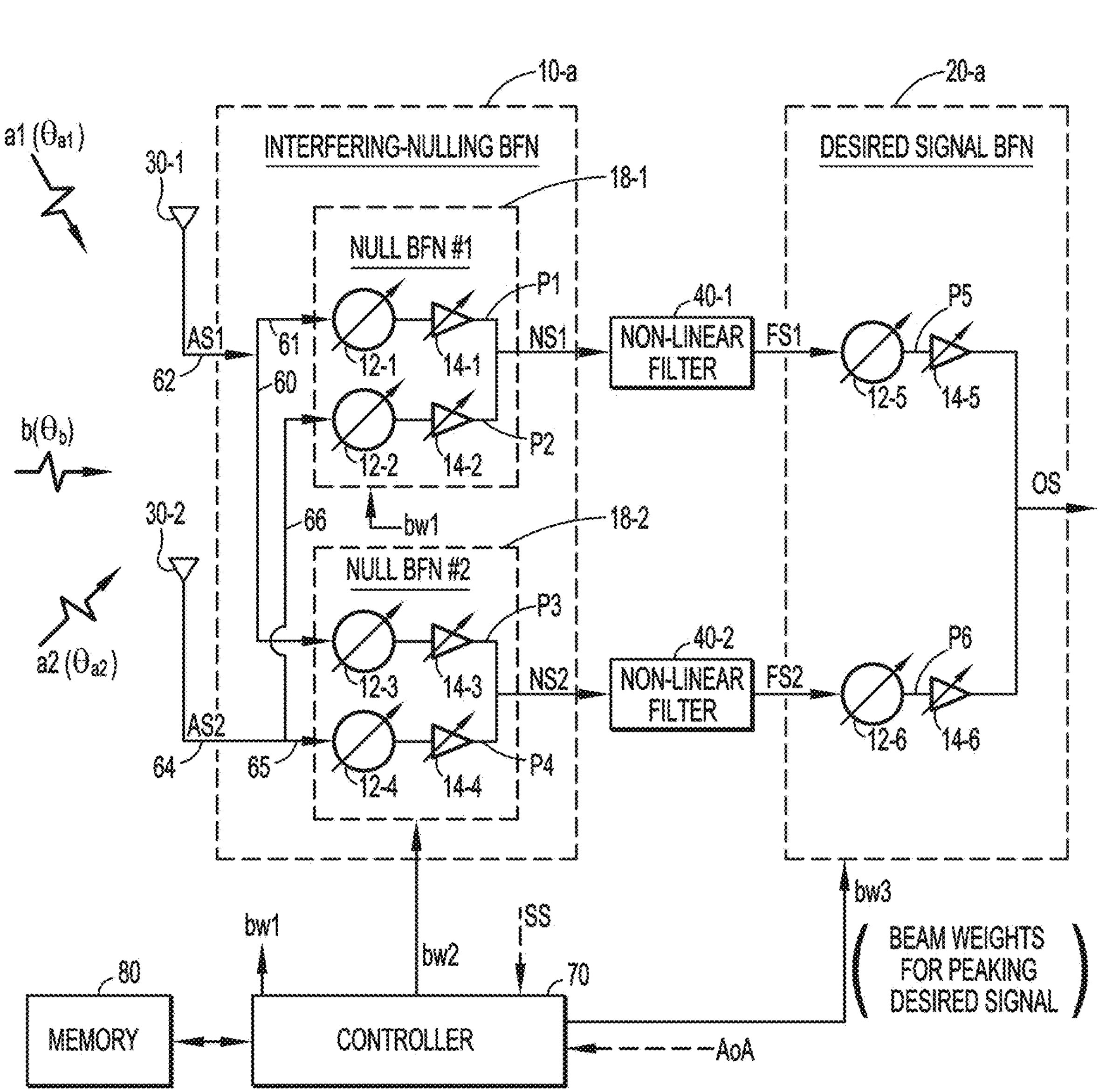
FIG. 2 is a schematic block diagram of an embodiment of the antenna array system of FIG. 1.

FIG. 2 is a schematic block diagram of an antenna array system 100-*a*, which can be an example of the antenna array system 100 of FIG. 1. Antenna array system 100-*a* includes an antenna array of N≥2 antenna elements, where an example of N=2 is depicted in FIG. 2 and will be described hereafter for simplicity of explanation. Antenna array system 100-*a* may further include an interferer-nulling BFN (IN-BFN) 10-*a*; non-linear filters 40-1, 40-2; a controller 70 coupled to a memory 80; and a desired signal BFN 20-*a*.

IN-BFN 10-*a* is coupled to each of antenna elements 30-1 and 30-2 and includes first and second null BFNs 18-1, 18-2. Antenna elements 30-1 and 30-2 provide antenna signals AS1 and AS2 to each of first null BFN 18-1 and second null BFN 18-2, which respectively output a first null signal NS1 and a second null signal NS2 derived from antenna signals AS1, AS2. As described in more detail below, each null BFN 18 applies weights to the antenna signals AS1, AS2 to define different antenna patterns having independent nulls aligned in the arrival direction of different interfering signals.

Antenna signal AS1, routed from antenna A1 on transmission line 62, is split between transmission lines 61 and 60 and provided to first null BFN 18-1 via transmission line 61 and to second null BFN 18-2 via transmission line 60. Antenna signal AS2 from antenna 30-2 on transmission line 64, is split between transmission lines 65 and 66 and provided to first null BFN 18-1 via transmission line 66 and to second null BFN 18-2 via transmission line 65.

First null BFN 18-1 includes a first signal weighting path P1 with a variable phase shifter 12-1 coupled in series with a variable amplitude adjuster 14-1 to apply phase and amplitude adjustments to antenna signal AS1 in response to first nulling beam weight (NBW) set bw1 provided by controller 70. Amplitude adjusters 14 may include variable attenuators and/or variable gain amplifiers. Note that in some applications, amplitude adjusters 14 may be omitted in antenna array system 100-*a*. First null BFN 18-1 further includes a second signal weighting path P2 with variable phase shifter 12-2 coupled in series with a variable amplitude adjuster 14-2 to apply phase and amplitude adjustments to antenna signal AS2 in response to first NBW set bw1 provided by controller 70. The outputs of signal weighting paths P1 and P2 are combined to output first null signal NS1. Second null BFN 18-2 includes a third signal weighting path P3 with a variable phase shifter 12-3 coupled in series with a variable amplitude adjuster 14-3 to apply phase and amplitude adjustments to antenna signal AS1 in response to second NBW set bw2 provided by controller 70. Second null BFN 18-2 further includes a fourth signal weighting path P4 with variable phase shifter 12-4 coupled in series with a variable amplitude adjuster 14-4 to apply phase and amplitude adjustments to antenna signal AS2 in response to second NBW set bw2 provided by controller. The outputs of signal weighting paths P3 and P4 are combined to output second null signal NS2. Controller 70 also applies a desired signal beam weight set bw3 to desired signal BFN 20-*a* to peak output signal OS (containing substantially only a desired signal b component).

Controller 70 includes control circuitry to generate the first NBW set bw1 to first null BFN 18-1 corresponding to a first antenna pattern having an independent null aligned in the arrival direction of interfering signal #1. NBW set bw1 may be comprised of control signals that control phase shifts of phase shifters 12-1, 12-2 and amounts of amplitude adjustment by amplitude adjusters 14-1, 14-2. Likewise, controller 70 may provide second NBW set bw2 to second null BFN 18-2 with beam weights corresponding to a second antenna pattern having an independent null aligned in the arrival direction of interfering signal #2. Controller 70 may be embodied with processing circuitry, which may be in the form of a general or specific-purpose processor, a digital signal processor (DSP), an application specific integrated circuit (ASIC), a field programmable gate array (FPGA) or other programmable logic device, discrete gate or transistor logic, discrete hardware components, or any combination thereof to perform its operations described herein. For instance, controller 70 may read and execute instructions read from memory 80 to perform its operations. Memory 80 can be any suitable non-transitory computer-readable storage medium.

In one embodiment, controller 70 receives arrival direction signals AoA from an external system (not shown) indicative of the angle of arrival of any interference signals. In this case, controller 70 may either retrieve NBW sets bw1, bw2 and desired signal beam weight set bw3 from look-up tables stored in memory 80, or may compute NBW sets bw1, bw2 and desired signal beam weight set bw3 using an algorithm based on egns. (1) to (6) herein. In other embodiments, controller 70 includes processing circuitry that detects any interfering signals and computes their angle of arrivals based on sampled signals SS coupled from couplers, sample/hold and A/D conversion circuitry (all not shown in FIG. 2) within antenna array system 100-*a*.

In doing so, null signal NS1 is comprised substantially of only an interference signal a2 component and a desired signal b component. Similarly, null signal NS2 is comprised substantially of only an interference signal a1 component and a desired signal b component.

Antenna array system 100-*a* further includes N non-linear filters 40-1 to 40-N, each coupled to an output of a null BFN 18. Two non-linear filters 40-1 and 40-2 are depicted in FIG. 2 for the two antenna element embodiment. Filters 40-1 and 40-2 output filtered signals FS1 and FS2 (akin to filtered signals #1 and #2 of FIG. 1) to desired signal BFN 20-*a*. Desired signal BFN 20-*a* may include a fifth signal weighting path P5 with variable phase shifter 12-5 coupled in series with amplitude adjuster 14-5; and a sixth signal weighting path P6 with variable phase shifter 12-6 coupled in series with amplitude adjuster 14-6. Desired signal BFN 20-*a* may receive a desired signal beam weight set bw3 from controller 70 for weighting signals FS1 and FS2 to define a third antenna pattern having a beam peak aligned with arrival direction of the desired signal b to form an output signal containing substantially only a desired signal b component. The NBW sets bw1 and bw2 and the desired signal beam weight set bw3 can vary from embodiment to embodiment and depend on the individual element patterns of the antenna elements 30-1, 30-2 and the arrangement (e.g., spacing, orientation, etc.) of the antenna elements 30-1, 30-2 in the array.

Interferer-Nulling BFN 10-*a* and desired signal BFN 20-*a* may perform analog or digital beam forming. In the analog beam forming embodiments, the phase shifters 12 and amplitude adjusters 14 (if any) use analog circuits. For the digital beam forming embodiments, each of the antenna signals AS1, AS2 can be passed through an analog-to-digital (A/D) converter to form a corresponding digital data stream. In such a case, the phase shifters 12 and amplitude adjusters 14 may be realized by processing circuitry (e.g., within controller 70) executing instructions to implement digital beam forming. Similarly, non-linear filters 40-1, 40-2 and desired signal BFN 20-*a* may be realized with dedicated circuit elements (analog and/or digital circuits) or by processing circuitry of a processor executing instructions for digital signal processing in a virtual case.

As noted, controller 70 may be configured in some embodiments to compute angle of arrival directions of any interference signals. In this case, to determine whether any interfering signals exist and their arrival directions, controller 70 may, as part of a testing routine, provide NBW set bw1 and/or NBW set bw2 with sequentially different weighting values to form individual antenna patterns that effectively steer a beam (and steer nulls of the beam) over a desired region of space. Arrival directions of any interfering signals may then be determined by controller 70 using any suitable algorithm. One example is a standard deviation (SD) based method described in further detail later. In such an SD based method, controller 70 may store interim scan beam SD results in memory 80 to find SD minima among all SD results. As described later, to identify the arrival directions, controller 70 may obtain samples of signals through couplers, sample and hold circuits, and A/D converters.

The controller 70 may be configured in some embodiments to change the mode operation of the antenna array 100-*a* over time based on the number of interfering signals that exist. In some embodiments, when the number of interfering signals is N (N=2 in this example), the controller 70 may control the antenna system 100-*a* (and more generally antenna system 100 of FIG. 1) to operate in a first mode as described above by forming the N null signals, etc. In contrast, when the number of interferers is less than N, controller 70 may control the antenna system 100-*a* (and more generally antenna system 100 of FIG. 1) to operate in a second mode. In the second mode, the controller provides a collective beam weight set to a particular one of the null BFNs of the interfering-nulling BFN. When the number of interferers is less than N, the N antenna elements provide sufficient degrees of freedom that the collective beam weight set, when applied to the N antenna signals, defines an antenna pattern having an independent null aligned to the arrival direction of each of the (less than N) interferers), while also having a beam peak aligned with arrival direction of the desired signal. The collective beam weight set can be computed or otherwise obtained by the controller 70 such as by using the techniques described above. In the second mode, the output signal NS1 ("beam signal") of the particular null BFN of the interfering-nulling BFN is a beam signal corresponding to the desired signal b. In some embodiments, in the second mode, the controller 70 controls bypass circuits (not shown) of the antenna array (e.g., switches) to selectively bypass the non-linear filters and the desired signal BFN and provides the beam signal to additional processing circuitry (not shown) that demodulates and processes the beam signal in a similar manner as the output signal OS output by the desired signal BFN is processed in the first mode. In other embodiments, in the second mode the beam signal passes through the corresponding non-linear filter, and the controller 70 provides a pass through beam weight set to the desired signal BFN that allows the beam signal to pass through the corresponding signal path to the output of the desired signal BFN, and attenuates (e.g., by applying zero weights) the other signal paths within the desired signal BFN.

Figure 3A:
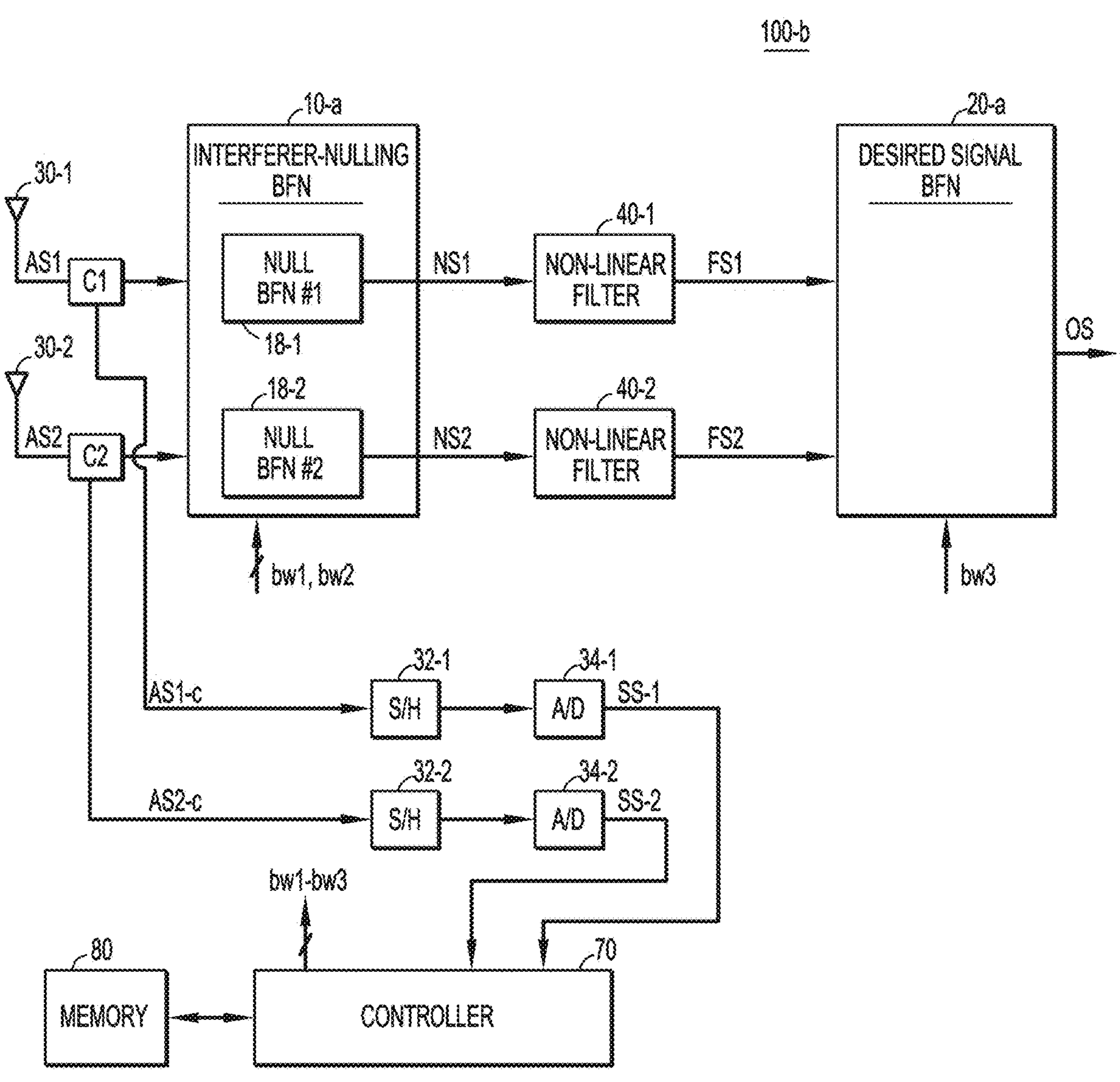
FIGS. 3A, 3B and 3C are block diagrams of respective example antenna array systems in which a processor/controller is configured to detect interfering signals and compute their angles of arrival upon the antenna array.
Figure 3B:
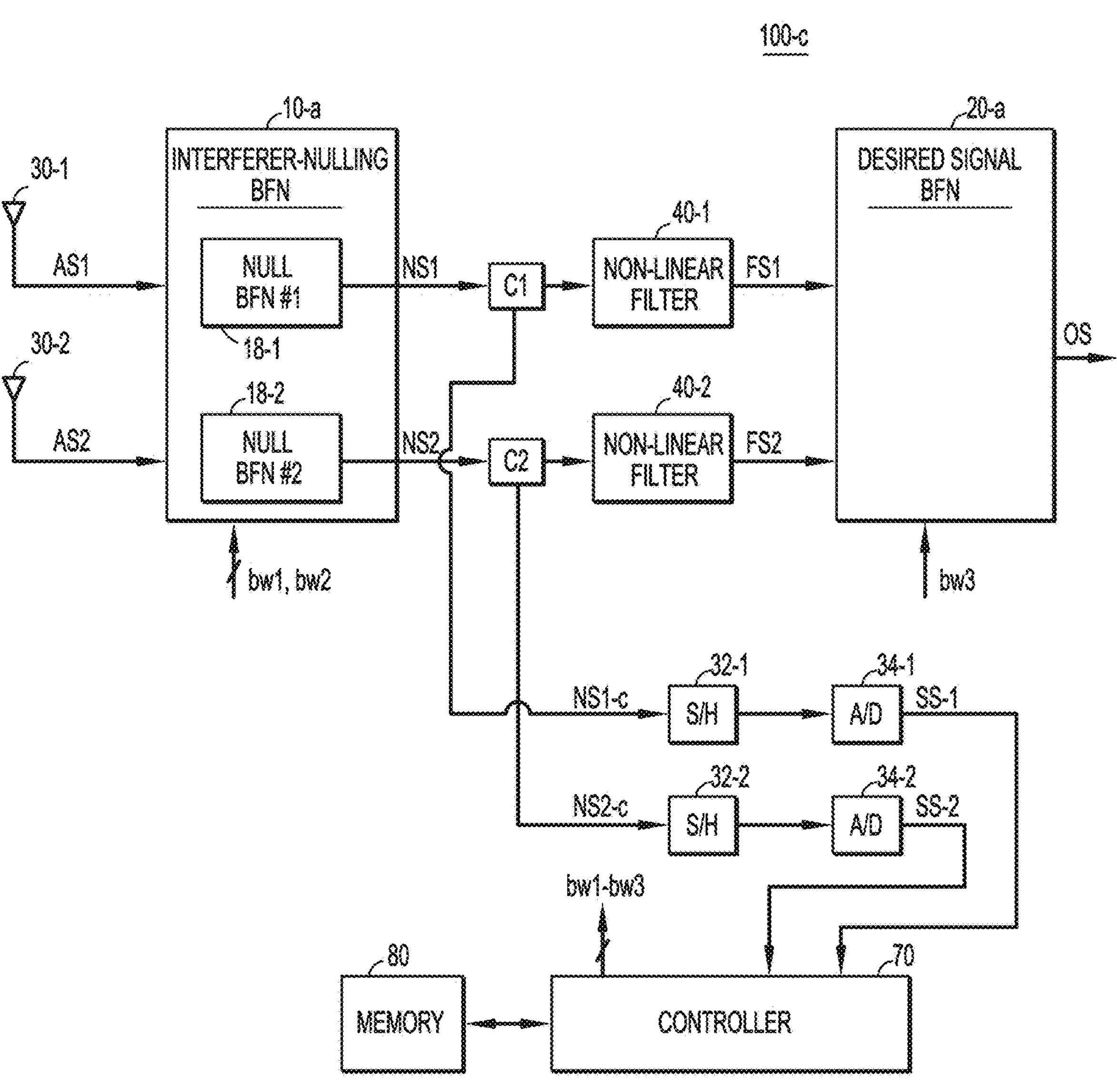
Figure 3C:
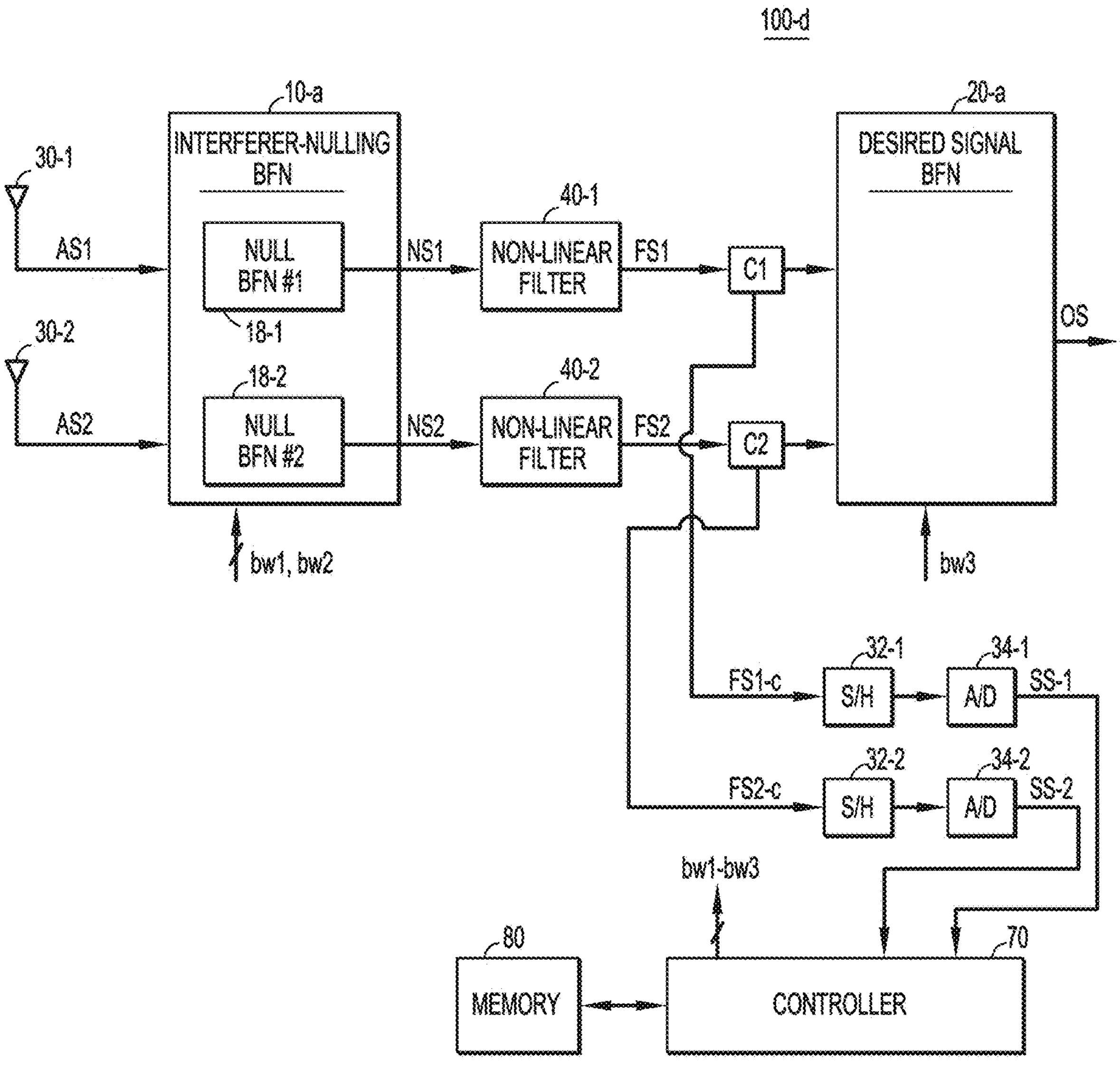

FIGS. 3A, 3B and 3C are block diagrams of respective embodiments of antenna array systems in which a controller is configured to detect interfering signals and compute their angles of arrival upon the antenna array. Each embodiment includes circuitry for providing a sequence of signal samples to the controller so that the latter may detect any interference signals and their angles of arrivals. Other aspects of these embodiments may be the same as those already described for antenna array systems 100 and 100-*a*.

As shown in FIG. 3A, antenna array system 100-*b* includes a first directional coupler ("coupler") C1 coupled between antenna 30-1 and IN-BFN 10-*a* and a second directional coupler C2 coupled between antenna 30-2 and IN-BFN-10-*a*. Couplers C1 and C2 couple signal energy from antenna signals AS1 and AS2 to provide coupled signals AS1-*c* and AS2-*c* to sample/hold circuits 32-1 and 32-2, respectively. Sampled levels output from sample/hold circuits 32-1 and 32-2 are applied to respective analog to digital (A/D) converters 34-1 and 34-2 which output sampled sequences SS-1 and SS-2, respectively, to controller 70. Each instance of a sampled sequence SS-1 or SS-2 may be comprised of M equally spaced samples. (In the antenna array systems of each of FIGS. 2 and 3A-3C, another directional coupler, not shown, may be provided at the output of desired signal BFN 20-*a* to couple signal energy from output signal OS back to controller 70 in a similar manner through another path with a series connection of a sample and hold circuit 32 and A/D converter 34. This feedback may facilitate the setting of the desired signal beam weight set bw3 by controller 70 to peak the output signal OS.)

As shown in FIG. 3B, antenna array system 100-*c* differs from embodiment 100-*b* by including couplers C1 and C2 placed in between interferer-nulling BFN 10 and non-linear filters 40-1 and 40-2, respectively. In this case, couplers C1 and C2 couple signal energy from null signals NS1 and NS2 to provide coupled signals NS1-*c* and NS2-*c* to sample/hold circuits 32-1 and 32-2, respectively. FIG. 3C shows another embodiment, antenna array system 100-*d*, in which couplers C1 and C2 are placed in between non-linear filters 40-1 and 40-2, respectively. Here, couplers C1, C2 couple signal energy of signals FS1, FS2 to provide coupled signals FS1-*c*, FS2-*c* to sample/hold circuits 32-1, 32-2, respectively. Other aspects of antenna array systems 100-*c* and 100-*d* may be the same as described for antenna array system 100-*a*. Note that a two antenna element example is depicted in each case, but the concepts are equally applicable to systems with N≥3 antenna elements 30-1 to 30-N and N≥3 null BFNs 18, by using N couplers C in respective signal paths, along with N sample/hold circuits 32 and N A/D converters 34.

Figure 4:
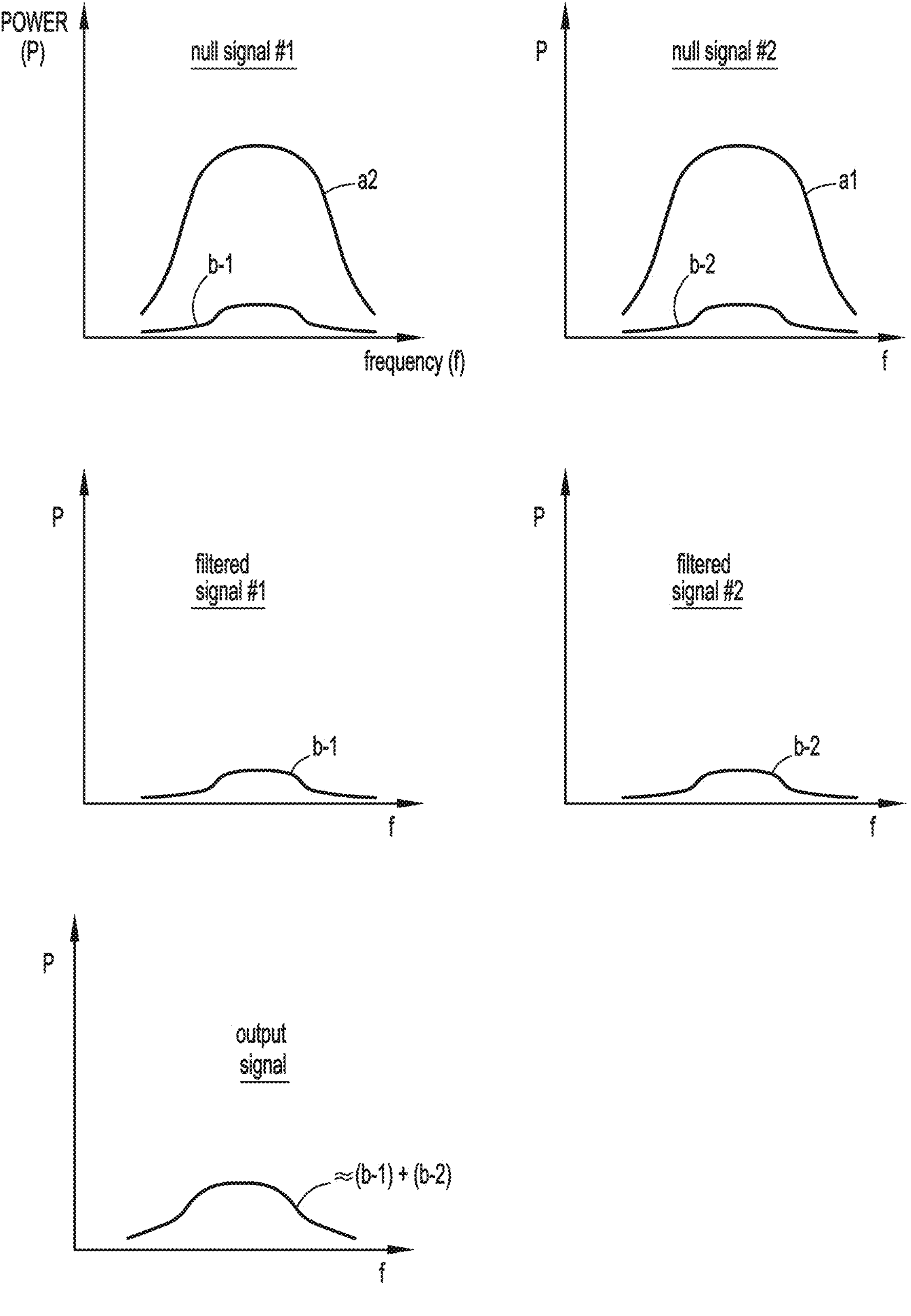
FIG. 4 shows graphs illustrating example components of various signals in an antenna array system according to an embodiment.

FIG. 4 shows graphs illustrating example components of various signals in antenna array system 100, after nulling beam weight sets have been fixed to achieve the desired nulling of interference signals described above. (Here, and in subsequent description, reference to antenna array system 100 is applicable to any of antenna array systems 100, 100-*a*, 100-*b*, 100-*c* or 100-*d* unless the context indicates otherwise.) It is seen that null signal #1 may be primarily composed of first interfering signal a2, and a signal b-1 representing a first portion of the signal energy of desired signal b received by antenna elements 30-1 and 30-2. (Signals b-1 and b-2 are understood as portions of the incoming desired signal b due to its power division between null BFNs 18-1 and 18-2.) Noise w may also be present in the null signals but is omitted from FIG. 4 for clarity of explanation. Null signal #2 may be primarily composed of second interfering signal a1 and a signal b-2 representing a second portion of the received desired signal b. The levels of signals a1 and a2 may each be at least one order of magnitude larger than those of signals b-1 and b-2, respectively. Each of interfering signals a1 and a2 may have spectral content that partially or completely overlaps that of desired signal b. Each of interfering signals a1 and a2 are also illustrated in this example to occupy approximately the same frequency range as that of desired signal b. In other cases, the bandwidth of the desired signal b only partially overlaps that of the interfering signals, and/or has a bandwidth narrower or wider than that of the interfering signals.

Null signal #1 is filtered by non-linear filter 40-1, which removes interfering signal a2 and outputs filtered signal #1 composed primarily of the desired signal portion b-1 as illustrated. Likewise, Null signal #2 is filtered by non-linear filter 40-2 to produce filtered signal #2 composed primarily of the desired signal portion b-2. Such non-linear filtering to remove a single interfering signal from a composite signal and recover a desired signal from the composite signal may be accomplished in any suitable way. One example employs a "polar excision" method, such as that described by the present inventor in P. Wyckoff, "Systems and methods for reducing a relatively high power, approximately constant envelope interference signal that spectrally overlaps a relatively low power desired signal", U.S. Patent Publication 2015/0311999 A1, Oct. 29, 2015. Such a polar excision method may derive in-phase (I) and quadrature phase (Q) components of a received signal, and convert the I and Q components into a polar signal. An estimated amplitude of the interference signal may be obtained from amplitude and phase samples of the polar signal taken in the time domain. The desired signal may be obtained by analyzing a difference amplitude for each time-domain sample in polar coordinates based on amplitude of the sample and the interference signal's estimated amplitude. Another exemplary polar excision method is described in Henttu, "A New Interference Suppression Algorithm Against Broadband Constant Envelope Interference," IEEE Miclom 2: 742-746 (2000). This method entails converting a complex received signal into polar coordinates, computing a fast fourier transform (FFT) on a sequence of amplitude samples, and then excising the spectrum of the amplitude samples. The excised spectrum is then transformed into the time domain using an inverse FFT (iFFT). It is noted here that if antenna array system 100 utilizes a polar excision method, quadrature demodulation to convert RF signals to baseband and to derive I and Q signal components is performed prior to converting the same to a polar signal; thus, the blocks for non-linear filters 40-1 and 40-2 may be considered to include suitable demodulation circuitry for this purpose.

Aside from the two polar excision techniques just outlined, other non-linear filtering techniques may be available to recover the desired signal portions b-1 and b-2 from the null signals #1 and #2. The desired signal portions b-1 and b-2 may be combined by desired signal BFN 20 to obtain the output signal OS (composed substantially of signal energy of just the desired signal b) at a higher signal level than that of the individual signal portions b-1 and b-2.

Figure 5:
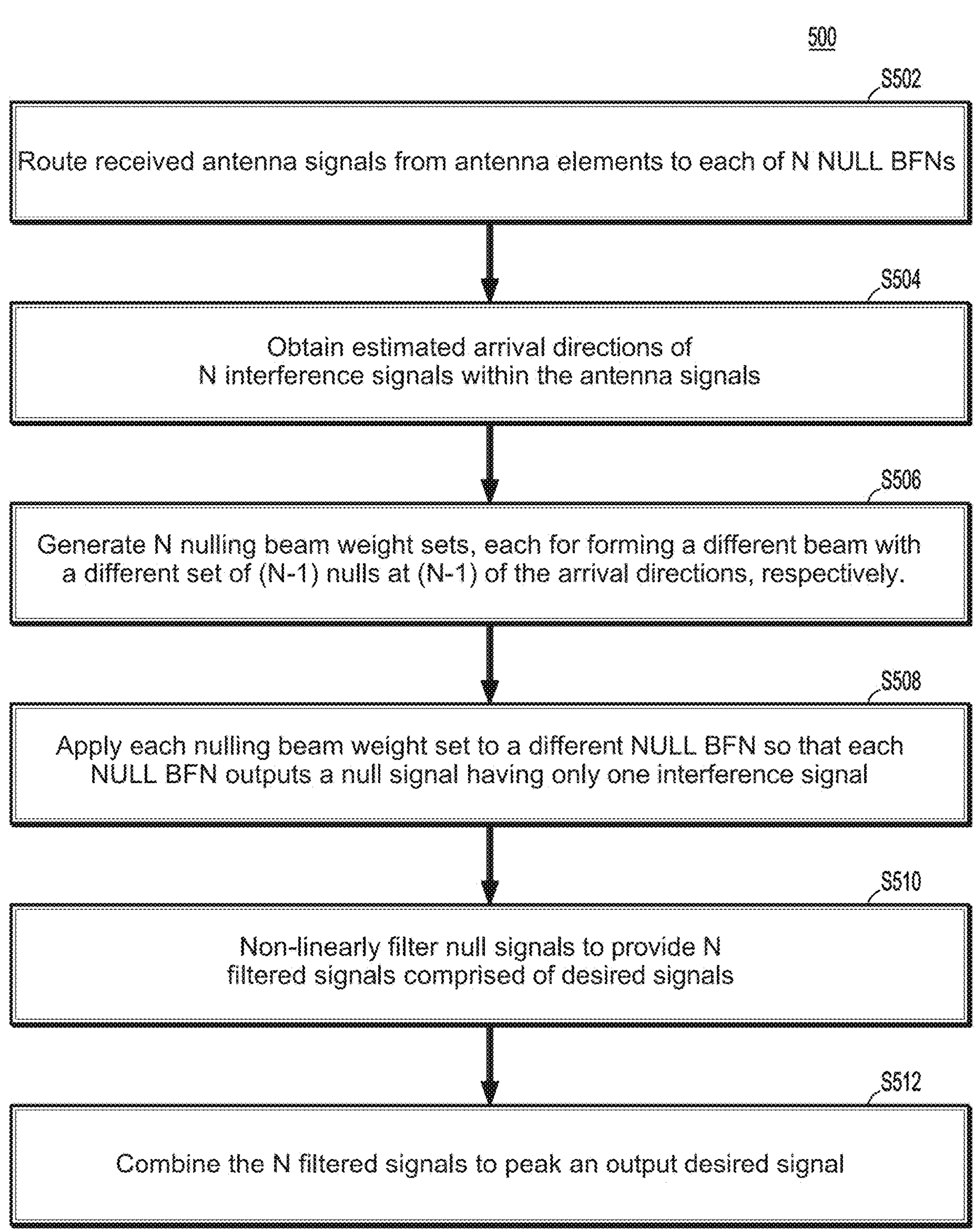
FIG. 5 is a flow chart of an example method performed by an antenna array system for mitigating interference signals.

FIG. 5 is a flow chart of an example method, 500, performed by antenna array system 100 for mitigating interference signals. Antenna signals received by the antenna array system are routed (S502) from antenna elements 30-A1 to 30-N to each of N null BFNs 18. Estimated arrival directions of N interference signals (if present) are obtained (S504). As described above, the arrival directions may be determined by an external system and provided as signals AoA to controller 70. Alternatively, controller 70 may determine whether interference signals exist and if so, compute their arrival directions based on sampled sequences obtained from the signal paths using directional couplers, sample/hold circuits and A/D converters as described earlier.

N nulling beam weight sets bw1-bwN may then be generated (S506), each for forming a different beam with a different set of (N−1) nulls at (N−1) of the arrival directions, respectively. Each nulling beam weight set bw may then be applied (S508) to a different null BFN 18 so that each null BFN 18 outputs a null signal having only one interference signal. In the example of a 2-element antenna array with two null BFNs 18-1 and 18-2, each having two signal paths (e.g. P1, P2), depending on the spacing of the array elements 30-1 and 30-2, an antenna pattern with first and second nulls may be formed with a typical spacing. In this case, if values of the nulling beam weight set bw are sequenced to “steer” the first null over a region of space, the second null is also steered, but not independently of the first null. In other words, there is one degree of freedom for steering the null in any given null BFN 18. Considering another example where N=3, each null BFN 18 may then have three signal paths, each with an independently settable phase shifter 12. In this case, two of the nulls may be independently steerable by adjusting the nulling beam weight set bw applied to the null BFN 18. The two independent nulls that are independently steerable may be steered to coincide with two interfering signals that have arrived from two different arrival directions. Thus, in the general case for which N null BFNs each receive N antenna signals AS1-ASN, there are (N−1) degrees of freedom in each null BFN for digitally steering nulls formed thereby. As a result, each null BFN effectively cancels all but one interfering signal.

With each null BFN 18 outputting a null signal containing a portion of the desired signal b and substantially only one different interfering signal, method 500 non-linearly filters the null signals (S510) using non-linear filters 40-1 to 40-N to provide N filtered signals FS1-FSN comprised of desired signal energy, e.g., signals b-1, b-2 described above. The filtered signals are then combined (S512) to peak an output desired signal.

Figure 6:
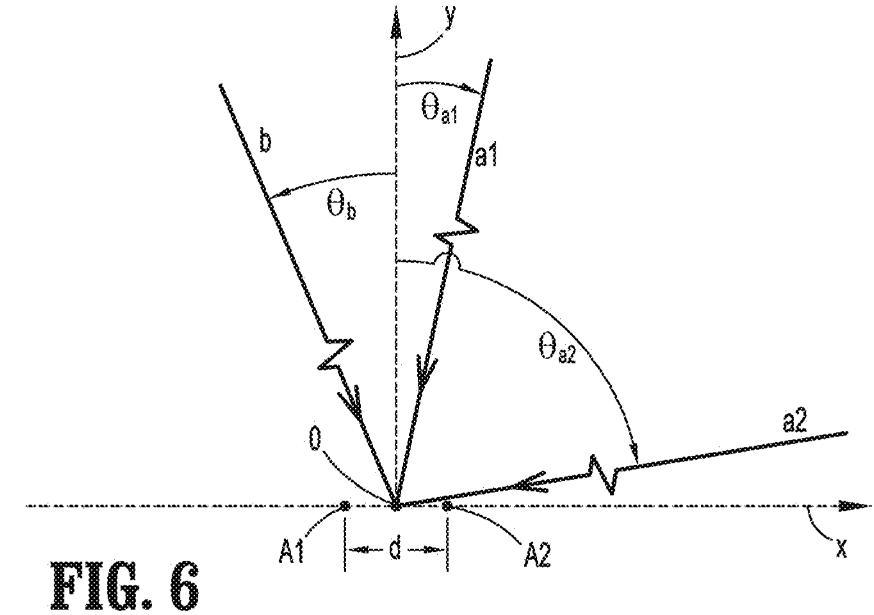
FIG. 6 is a diagram illustrating example signals arriving at an antenna array of an example antenna array system.

FIG. 6 is a diagram illustrating example signals arriving at the antenna array of antenna array system 100. For simplicity of illustration, antenna elements 30-1 and 30-2 are depicted as isotropic elements separated by a distance d. The type of antenna elements 30-1 and 30-2 (e.g., dipoles, microstrip patches, etc.) and the distance d (e.g., λ/4, λ/2, etc.) may be selected to achieve any suitable design objective. Antenna elements A1 and A2 are aligned along an axis x, such that a normal axis y can be drawn to the center of the antenna array at an origin “o”. An angle θ in the y-x plane can be drawn with respect to the y axis and a line intersecting the origin o.

An example is presented hereafter to facilitate an understanding of the systems and methods described herein. In this example, the first interfering signal a1 arrives at origin o from an angle θa1=10°; the second interfering signal a2 arrives at an angle θa2=80°; and the desired signal b arrives at an angle θb. In this example the interfering signals a1 and a2 are constant envelope signals of approximately equal signal strength, and each arrives with signal strength at least an order of magnitude higher (i.e., at least 10× higher) than the desired signal b. In this example, the antenna elements 30-1, 30-2 are positioned in free space, resulting in field intensity patterns spanning +/−180°. Alternatively, they may be placed over a ground plane, in which case patterns spanning +/−90° may be spanned.

Figure 7A:
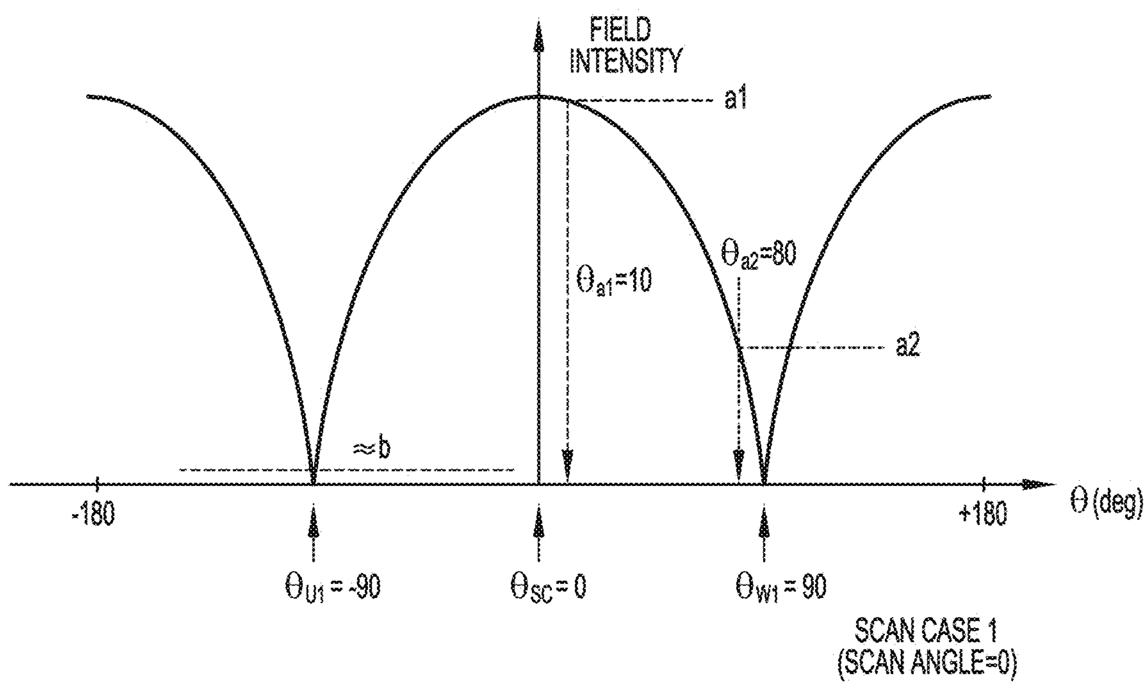
FIGS. 7A, 7B and 7C each show a respective graph of an example radiation pattern for a corresponding scan angle case established by an example antenna system.

FIG. 7A shows an example antenna pattern that may be established using interferer-nulling BFN 10 of antenna array system 100. The pattern corresponds to a “scan case 1” in which the antenna signals of antenna elements A1 and A2 of FIG. 2 are weighted with equal insertion phase and loss. This results in an ideal broadside pencil beam pattern with a beam peak θsc=0°, a first null at θw1=90°, and a second null at θu1=−90°. The antenna pattern of the scan case may be assumed to be represented by null signal #1 or null signal #2 of FIG. 1 prior to applying the respective nulling beam weight set applied to the respective null BFN 18-1 or 18-2 to null out one of the interfering signals. Thus, FIG. 7A may correspond to a scan beam formed during an initial step, prior to obtaining the arrival direction of the one or more interfering signals to be nulled. Since signal a1 arrives at an angle close to the beam peak whereas signal a2 arrives close to the beam null, the resulting null signal #1 or null signal #2 will have a higher component of signal a1 than signal a2. However, if an optimal beam weight setting is applied, null signal #1 will have minimal signal power of interfering signal a1, and null signal #2 having will have minimal signal power of signal a2.

Figure 7B:
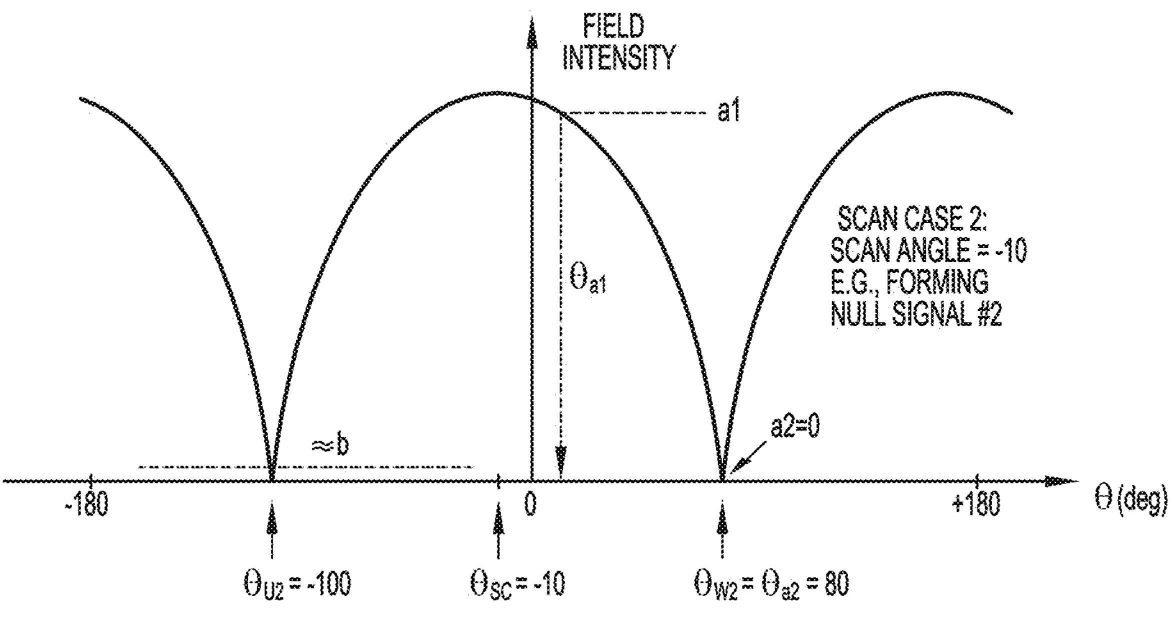

Accordingly, a sequence of test scan beams may be generated by IN-BFN 10 (e.g., as controlled by controller 70 in any of antenna array systems 100-*b* to 100-*d*) to arrive at first and second nulling beam weight sets that have nulls coinciding respectively with θa1 and θa2 and thereby generate null signals. FIG. 7B illustrates an antenna pattern for Scan case 2 in which a first (independent) null θw2 has moved to 80°, coinciding with the angle of arrival θa2 (or arrival direction) of interfering signal a2. Accordingly, in the null signal representing Scan case 2, the signal energy of interfering signal a2 is zero. Thus, the nulling beam weight set used to generate this condition may be thereafter applied by the second null BFN 18-2 to generate null signal #2.

Figure 7C:
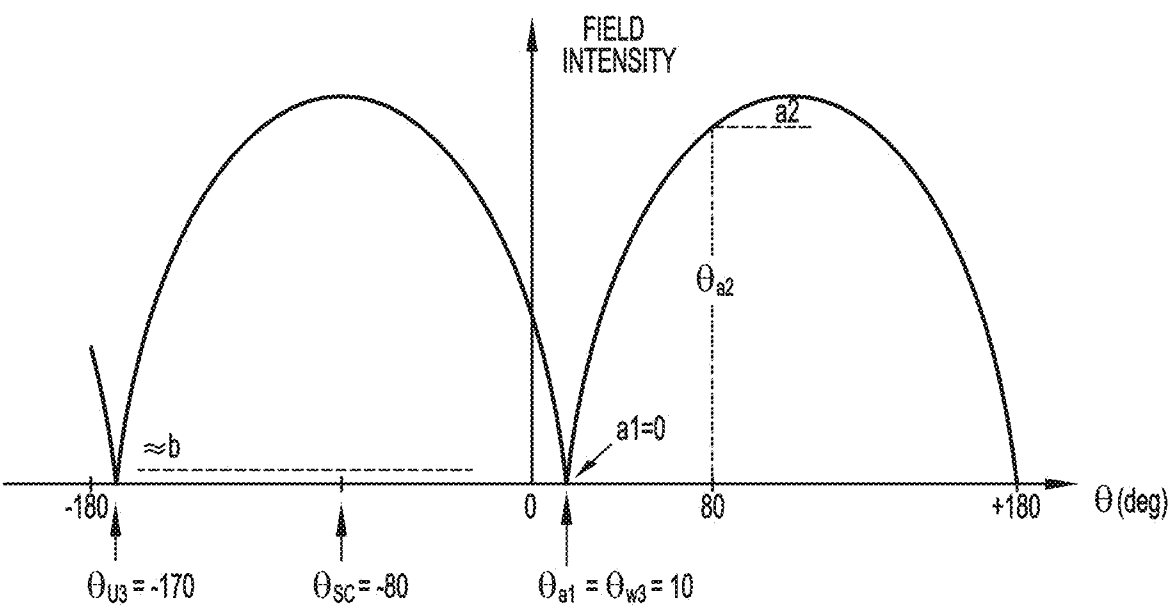

Similarly, as shown in FIG. 7C, a Scan case 3 may use a scan angle of −80° to realize a first (independent) null θw3 at 10° and a second null θu3 at −170°. Since the first null θw3 coincides with the arrival angle θa1 (or arrival direction) of interfering signal #1, this case results in interfering signal #1 being nulled. Hence, a nulling beam weight set used to generate Scan case 3 may be subsequently applied by the first null BFN 18-1 to generate null signal #1.

Figure 8:
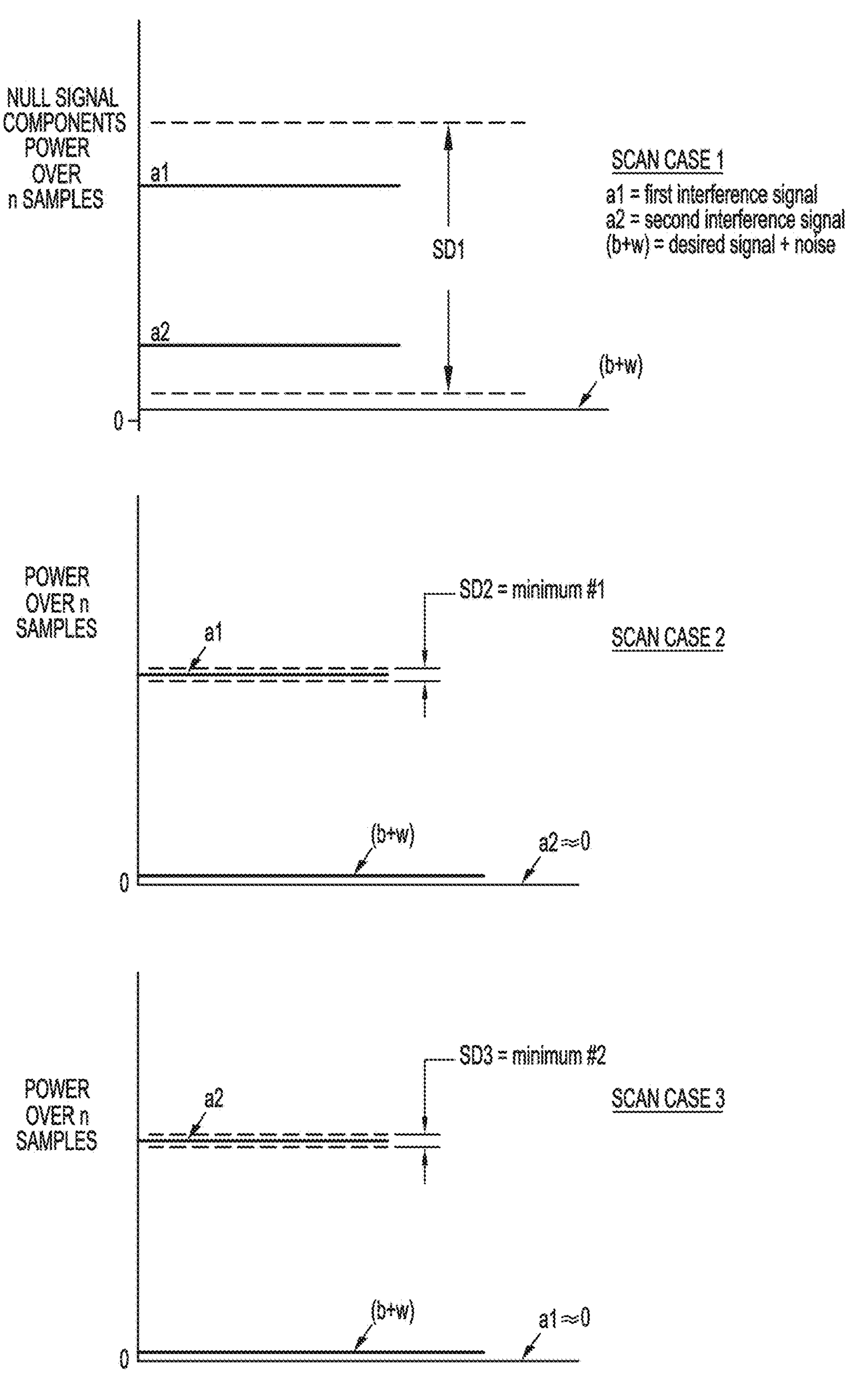
FIG. 8 is a diagram illustrating examples of standard deviation in antenna receive signal power for different scan angle setups in an example antenna array system, to illustrate an example method of determining arrival directions of interference signals.

FIG. 8 illustrates an example method of determining arrival directions of interfering signals incident to antenna array system 100. The method utilizes a standard deviation (SD) based technique in which the SD of "n" sequential samples of each of a plurality of test scan beam signals is measured. For instance, when a scan beam test signal has an SD that is one of N minima among the SDs of a full set of test scan beam signals, the scan beam can be assumed to have a null at the angle of arrival of one of the interfering signals. This condition may be understood using the following example:

The scan beam signal can be understood as one of the null signals #1 or #2 in an initial step/test phase prior to setting fixed beam forming weights for nulling. The scan beam signal in the case of N=2 (and when the two interfering signals a1 and a2 exist) is a composite signal composed of: i) the desired signal b; ii) the first interfering signal a1; iii) the second interfering signal a2; and, iv) noise w. When no null coincides with either of the interfering signals a1 or a2, since the interfering signals may be large constant envelope information signals with random phase, they may randomly combine over time. Consequently, if a sufficient number n of sequential samples are taken, the SD of the scan beam signal for n samples will be relatively large. This is illustrated in the upper graph of FIG. 8 corresponding to Scan case 1, where the resulting standard deviation SD1 is well higher than expected for a null condition.

It is noted that the levels for interfering signals a1 and a2 are each considerably higher in this example than the desired signal plus noise (b+w). As such, the (b+w) component does not have a significant effect on the SD of the scan beam signal. As further illustrated in the central graph of FIG. 8, in Scan case 2 corresponding to interfering signal a2 being nulled, the standard deviation SD2 coincides with a first minimum (minimum #1) among SDs of all test scan beams. Similarly, for Scan case 3 in which interfering signal a1 is nulled, a standard deviation SD3 is found to be a second minimum (minimum #2) among the SDs of all test scan beams. Accordingly, the method may conclude that one of the two nulls formed in Scan case 2 coincides with the arrival angle of a first interfering signal, and one of the two nulls formed in Scan case 3 coincides with another interfering signal. The beam weight sets used to generate Scan cases 2 and 3 may then be respectively allocated as the first and second nulling beam weight sets bw1, bw2 to be subsequently used to generate null signals #1 and #2 for recovering the desired signal on a continual basis.

Figure 9:
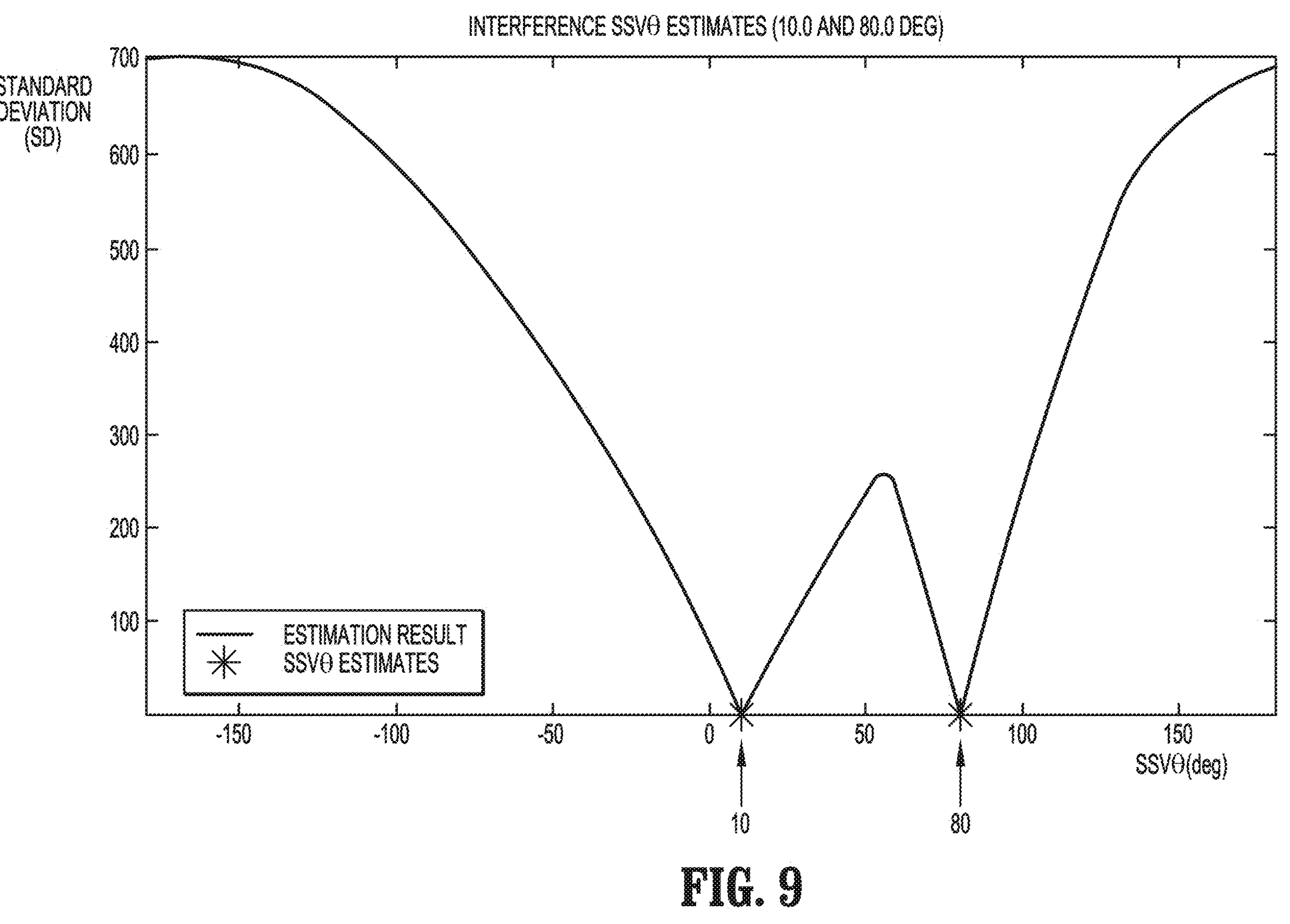
FIG. 9 is an example graph of standard deviation of antenna receive signal power vs. spatial signal vector theta, illustrating an example technique of determining arrival directions of interference signals.

FIG. 9 is an example simulation graph of standard deviation of antenna receive signal power vs. spatial signal vector (SSV) 0. The parameter SSV 0 may be understood as the angle of arrival of a signal upon an antenna aperture. The example of FIG. 9 corresponds to the case exemplified above in which two interfering signals are incident upon a two element antenna array at respective angles of 100 and 80°. Using the standard deviation minima detection method just outlined above, it is seen that the simulation correctly discovered the presence of the interfering signals at 10° and 80°.

FIG. 10 is a flow chart of an example method, 800, performed by antenna array system 100 for mitigating interference signals. For example, method 800 may be controlled by controller 70 and correspond to the analog circuitry case for IN-BFN 10-*a* mentioned above. Method 800 applied to a two antenna element case for the antenna array system will be discussed below for explanatory purposes; the method is expandable to antenna systems with higher numbers of antenna elements. Method 800 may include operations to determine arrival directions of any identified interference signals, and to establish nulling beam weight sets bw1, bw2 to selectively null the interference signals for improved recovery of a desired signal subsequently received. Method 800 may be performed periodically by antenna system 100 during normal receiving operations. To this end, an initial operation S802 may involve controller 70 setting a total number "m" of test scan beams with peaks pointing at different test angles over a desired region of space, e.g., angles equally spaced over a 180° or 360° span in each desired plane. As described earlier, the signal energy received through each scan beam may be representable by null signal #1 (NS1) or null signal #2 (NS2), prior to a final setting of the beam weight sets bw1/bw2 for nulling out interfering signals. Whether the antenna array comprised of antenna elements 30-1 to 30-N is a linear array, a planar array or a 3D array, the m scan beams may be formed with a null steerable to a desired angle of arrival relative to a reference axis, where the angle of arrival may be a direction anywhere in three dimensional space.

Beam weights "bw", each being a beam weight subset within a beam weight set bw1 or bw2, may then be assigned by controller 70 (S804) to respective paths of null BFN #1 and/or #2 to form each test scan beam based on known path lengths between null BFN #1 and/or #2 and each antenna element A1, A2. For instance, in FIG. 2, the combined insertion phase of transmission lines 60 and 62 (path length from antenna element A1 to phase shifter 12-3) may be equal or unequal to the combined insertion phase of transmission lines 64 and 65 (path length from antenna element A2 to phase shifter 12-4). Controller 70 may take the path length relationship into account when setting beam weights controlling phase shifts in phase shifters 12 to generate test scan beams. For each test scan beam, controller 70 may determine null angles θu, θw, e.g. by calculation or by reading corresponding null angle data for each test scan beam from a look up table in memory 80.

For each scan beam, a sampled sequence of n samples may be taken (S806) of the magnitude of each of null signal #1 and null signal #2 by sampling signal energy obtained through directional couplers C1, C2, using sample/hold circuits 32 and A/D converters 34. A first standard deviation SD #1 of the n samples of null signal #1 may then be computed. A second standard deviation SD #2 of the n samples of null signal #2 may also be computed. Among the total number m of each of the SD #1 and SD #2 results for the corresponding m scan beams, controller 70 may determine (S808) local minima over the test region of space. Here, controller 70 may determine whether at least one of the local minima is indicative of an interfering signal. This determination may be based on statistical based models that take into account at least: an expected range of standard deviation over the test region of space; an expected level of the desired signal relative to any interfering signal; an expected amount of multipath interference; and AWGN. The statistical model may be based on the type of signals expected for any interfering signals, and the type of desired signal. For instance, in one example the desired signal is a spread spectrum signal whereas the expected interfering signals are constant envelope signals such as FM, GMSK, PSK or frequency hopping signals, e.g., OFDM signals. In other examples, the desired signal is a constant envelope signal.

For example, a model may expect that if at least two strong interfering signals are received, there will be a wide range of SDs over the test space, resulting in SDs at the minima which are significantly smaller than SDs at local maxima. If exactly two strong interfering signals are received, the model may expect each of the minima to be below a threshold "H" and the maxima over a certain range of the test space to be above another threshold "Q". On the other hand, if there are no interfering signals or only a single strong interfering signal, the model may expect a small range of SDs over the test space, whereby an average difference between minima and maxima will be small.

If test scan beams are generated by both null BFN #1 and null BFN #2, the results may be correlated between null BFN #1 and null BFN #2 to identify the arrival angles for any interfering signals at a higher confidence level. If none of the local minima is indicative of an interfering signal based on the model, controller 70 may assign (S810) default beam weights to null BFN #1 and null BFN #2 signal paths for subsequent signal reception. If only one of the local minima is indicative of an interfering signal, beam weights associated with that scam beam may be assigned (S812) to the null BFN #1 signal paths and/or the null BFN #2 signal paths to suppress that interfering signal.

If at least two of the local minima are each indicative of an interfering signal, corresponding beam weights may be assigned to each of the null BFN #1 signal paths and the null BFN #2 signal paths. For instance, when a first test scan beam generated by null BFN #1 is identified as a scan beam that produces an SD minimum #1 and, based on the statistical model, it is estimated that two strong interferers are received, it can be assumed that the first null θw or the second null θu of that scan beam is aligned with one of the two interfering signals. When a second test scan beam generated by null BFN #1 is identified as a scan beam that produces an SD minimum #2, it can be assumed that the first null θw or the second null θu of the second scan beam is aligned with the other of the two interfering signals. Thus, weights bw1 that were used for generating minimum #1 may be thereafter assigned (S814) to the Null BFN #1 signal paths for a subsequent, fixed null beam weighting set, and weights bw2 used for generating minimum #2 may thereafter be assigned (S810) to the Null BFN #2 signal paths. Samples of subsequent null signals #1/#2 obtained with the finalized null beam weighting sets may then be applied (S816) to the respective non-linear filter 40-1 or 40-2.

Method 800 has been described in the context of one or more null BFNs generating test beams to steer a null to a direction aligned with one or more interfering signals. In other embodiments, a dithering technique may be employed to dither a beam formed by a nulling beam weight set currently being used to receive (and subsequently demodulate) data within desired signal b obtained from the output signal OS. With this technique, a sequence of samples may be taken in real time while the output signal OS from desired signal BFN 20 is demodulated and the data thereof is decoded. In still other embodiments, another statistical parameter, such as variance, may be substituted for standard deviation.

In other embodiments of methods for determining angle of arrival directions and setting nulling beam weight sets correspondingly, sample sequences are taken from other points in antenna system 100. For instance, if IN-BFN 10 is implemented virtually by processing circuitry within a processor, sampled sequences may be taken by coupling energy from signals AS1, AS2 using the configuration of antenna array system 100-*b* of FIG. 3A. In another embodiment, sample sequences of the filtered signals FS1, FS2 are obtained as in antenna array system 100-*d* of FIG. 3C and used by controller 70 to compute angles of arrival. In yet another embodiment, a sampled sequence of output signal OS is obtained and used to compute angles of arrival. Other operations of these embodiments may the same or similar to those described for FIG. 10.

The above-described embodiments have been described in the context of N interfering signals and one desired signal received by an antenna array with N antenna elements. While antenna array systems 100 are capable of recovering the desired signal in such an environment, as mentioned earlier, they are also configured to recover the desired signal when less than N interfering signals are present. For instance, when no interfering signals are determined to exist, the phase shifters 12 and amplitude adjusters 14 in antenna array system 100-(*a-d*) may be set to default settings in which an equal phase shift and/or amplitude adjustment is made in each signal weighting path P1-P4. If only (N−1) interfering signals are determined to exist, a nulling beam weight set for nulling at least one interference signal may be applied in only (N−1) of N null BFNs 18.

Further, the above-described embodiments have been described primarily in the context of an antenna array system configuration with "N=2". The concepts described herein are equally applicable to embodiments with N=3 or more. In these cases, antenna array system 100 may include N≥3 antenna elements 30-1 to N30-N; N≥3 null BFNs 18-1 to 18-N that output N≥3 null signals #1 to #N; N≥3 non-linear filters 401 to 40-N; and N≥3 signal paths (akin to paths P5, P6) within desired signal BFN 20-*a*. Further, each null BFN 18 would include N≥3 signal paths akin to signal paths P1 and P2, where each of the N≥3 signal paths may include a phase shifter 12 and an amplitude adjuster 14. In these cases, each null signal #1 to #N may be a composite signal composed substantially of first and second components, where the first component contains signal energy of a different one of the interfering signals #1 to #N, and the second component contains signal energy of a respective divided portion of the received desired signal b (plus noise w). Thus, each null BFN 18 effectively nulls a different set of (N−1) interfering signals among the N interfering signals #1 to #N.

Moreover, while the above-described embodiments may have optimum performance in an environment in which the interfering signals are constant envelope signals that each at least one order of magnitude higher in signal strength than the desired signal, embodiments may still achieve beneficial results when interfering signals without such characteristics are received.

As mentioned, controller 70 may include a processor that reads instructions from memory 80 to perform its operations described herein. The term "processor" as used herein is intended to include any processing device, such as, for example, one that includes a central processing unit (CPU) and/or other processing circuitry (e.g., digital signal processor (DSP), microprocessor, etc.). Moreover, a "processor" includes computational hardware and may refer to a multi-core processor that contains multiple processing cores in a computing device. Various elements associated with a processing device may be shared by other processing devices.

While the technology described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. A method for suppressing a plurality of interference signals received by an antenna array that concurrently receives a desired signal, the method comprising:

receiving N antenna signals from the antenna array, wherein the antenna array comprises N antenna elements, where N is greater than one;

obtaining respective arrival directions of the interference signals upon the antenna array;

applying each of a plurality of nulling beam weight sets to a respective one of N null beam forming networks (null BFNs) of an interferer-nulling beam forming network coupled to the antenna array to generate N null signals, wherein each nulling beam weight set corresponds to a different respective set of (N−1) independent nulls corresponding to (N−1) of the arrival directions, such that within each null signal, (N−1) of the interference signals are suppressed with respect to each of a remaining one of the interference signals and the desired signal;

filtering each of the N null signals using a respective one of N non-linear filters to suppress the respective remaining one of the interference signals with respect to the desired signal, thereby generating N filtered signals; and combining the N filtered signals to generate an output signal corresponding to the desired signal, wherein said obtaining estimated respective arrival directions comprises:

coupling signal energy from at least one signal path between the antenna array and a signal path containing the output signal to provide at least one coupled signal;

sampling the coupled signal to provide a sequence of samples; and computing the arrival directions using the sequence of samples.

2. The method of claim 1, wherein said computing the arrival directions using the sequence of samples comprises analyzing instances of a statistical parameter of the sequence of samples respectively obtained in correspondence with test scan beams formed in a corresponding at least one of the null BFNs.

3. The method of claim 2, wherein the statistical parameter is standard deviation, and said computing the arrival directions further comprises identifying a local minimum of standard deviation of the samples over a test region of space, wherein the local minimum is determined to correspond to a test scan beam, of a plurality of sequential test scan beams, that has a null at an angle of arrival of an interference signal, and the method further comprising setting a beam weight set corresponding to that test scan beam for reception of subsequent signals in at least one of the null BFNs.

4. The method of claim 1, wherein each of the interference signals received by the antenna array has a larger magnitude than the desired signal.

5. The method of claim 1, wherein each of the interference signals received by the antenna array has a magnitude at least ten times that of the desired signal.

6. The method of claim 1, wherein each of the interference signals is a substantially constant envelope signal that overlaps the desired signal in frequency spectrum and in time.

7. The method of claim 1, wherein said non-linearly filtering each of the null signals comprises polar excising each of the null signals.

8. The method of claim 1, wherein the respective one of the N filtered signals from each of the N non-linear filters is not a linear function of the respective one of the N null signals.

9. The method of claim 1, further comprising generating the respective nulling beam weight set for each of the N null BFNs, and generating a desired signal beam weight set for combining the N filtered signals.

10. The method of claim 1, wherein each of the interferer nulling beam forming network and the non-linear filters comprise analog circuitry.

11. The method of claim 1, wherein each of the interferer nulling beam forming network and the non-linear filters is a virtual element having respective functions implemented by digital circuitry.

12. A method for suppressing a plurality of interference signals received by an antenna array that concurrently receives a desired signal, the method comprising:

receiving N antenna signals from the antenna array, wherein the antenna array comprises N antenna elements, where N is greater than one;

obtaining respective arrival directions of the interference signals upon the antenna array;

applying each of a plurality of nulling beam weight sets to a respective one of N null beam forming networks (null BFNs) of an interferer-nulling beam forming network coupled to the antenna array to generate N null signals, wherein each nulling beam weight set corresponds to a different respective set of (N−1) independent nulls corresponding to (N−1) of the arrival directions, such that within each null signal, (N−1) of the interference signals are suppressed with respect to each of a remaining one of the interference signals and the desired signal;

filtering each of the N null signals using a respective one of N non-linear filters to suppress the respective remaining one of the interference signals with respect to the desired signal, thereby generating N filtered signals;

combining the N filtered signals to generate an output signal corresponding to the desired signal;

operating in a first mode using the plurality of beam weight sets when a number of interference signals is equal to N, and operating in a second mode when the number of interference signals is less than N;

in the first mode, providing the respective nulling beam weight set to each of the null BFNs, and providing a desired signal beam weight set to a desired signal beam forming network to combine the filtered signals to generate the output signal; and in the second mode, providing a collective beam weight set to a particular null BFN of the null BFNs, wherein the collective beam weight set corresponds to independent nulls aligned to arrival directions of the interference signals and a beam peak aligned with an arrival direction of the desired signal.

* * * * *